United States Patent [19]
Dominik

[11] 3,720,450
[45] March 13, 1973

[54] TAPERED ROLLER RETAINER AND METHOD OF BEARING ASSEMBLY

[75] Inventor: Erich Dietmar Dominik, Canton, Ohio

[73] Assignee: The Timken Company, Canton, Ohio

[22] Filed: April 5, 1971

[21] Appl. No.: 131,282

[52] U.S. Cl. ................................................308/214
[51] Int. Cl. ............................F16c 33/00, F16c 19/00
[58] Field of Search..............................308/214, 217

[56] References Cited

UNITED STATES PATENTS

| 2,435,839 | 2/1948 | McNicoll | 308/218 |
| 3,075,278 | 1/1963 | Bratt | 308/217 |

FOREIGN PATENTS OR APPLICATIONS

| 211,182 | 7/1966 | Sweden | 308/214 |

Primary Examiner—Charles J. Myhre
Assistant Examiner—Frank Susko
Attorney—Gravely, Lieder & Woodruff

[57] ABSTRACT

A tapered roller retainer for tapered roller bearings in which the retainer is a one-piece molded body having a single flange supporting roller cage fingers. The roller cage fingers form reverse tapered pockets for the tapered rollers and the body of the retainer is sufficiently resilient to permit flexing of the cage fingers to facilitate insertion of the tapered rollers. The flexing of the tapered roller retainer with the reverse tapered roller pockets improves and facilitates bearing assembly methods.

4 Claims, 7 Drawing Figures

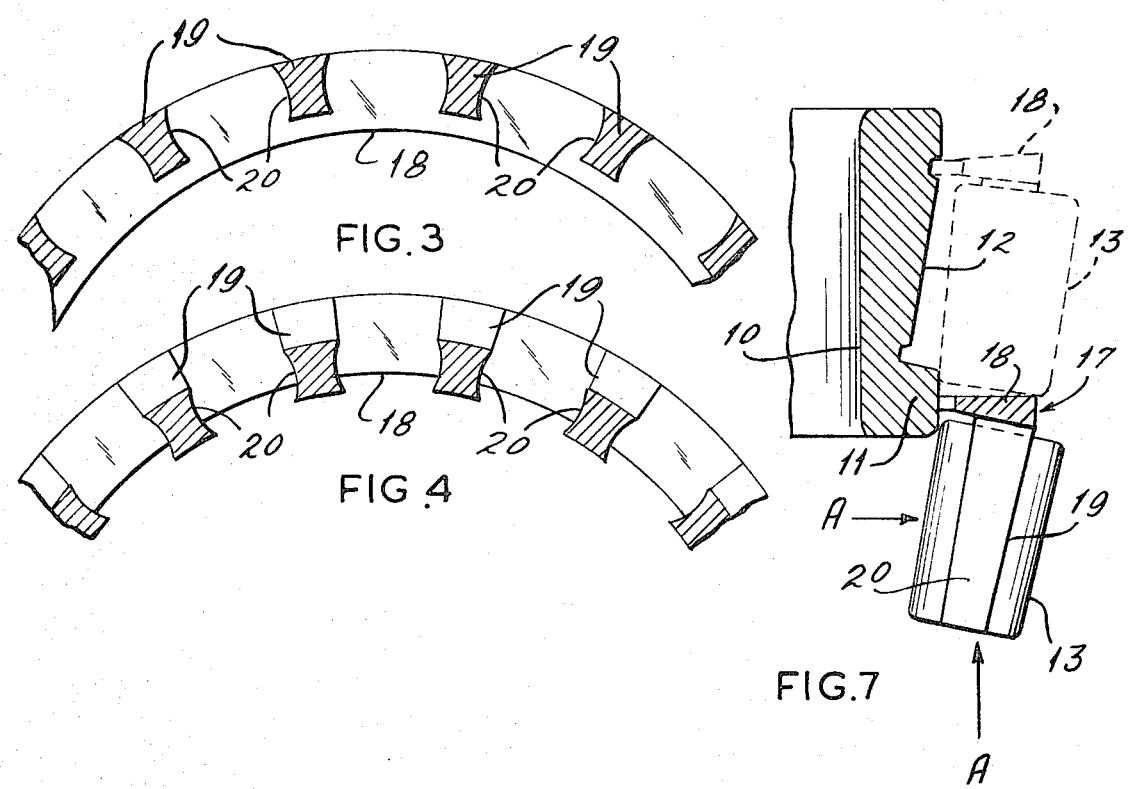
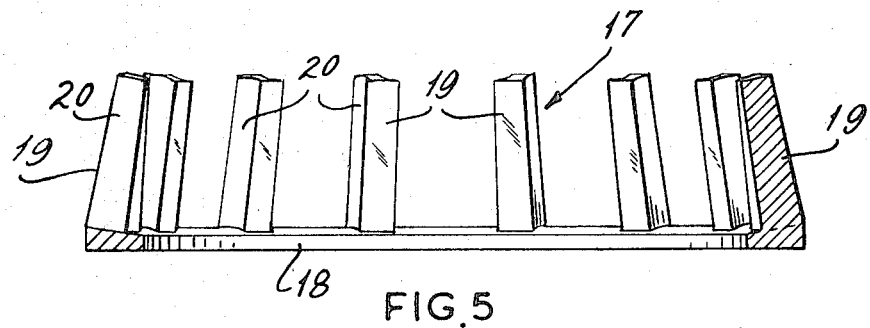
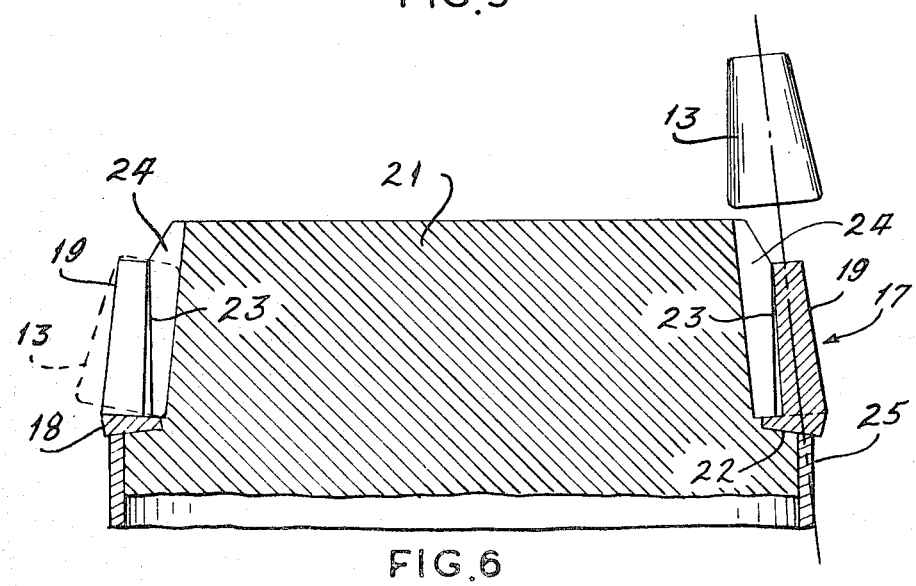

TAPERED ROLLER RETAINER AND METHOD OF BEARING ASSEMBLY

BACKGROUND OF THE INVENTION

This invention relates to improved tapered roller retainers and to simpler methods of bearing assembly utilizing the characteristics of the roller retainer.

The prior efforts to use moldable material for producing bearing retainers has generally centered around the injection molding process because it offers high production capability with low labor cost and satisfactory precision even with parts having complex details. In the case of tapered roller retainers or cages, the prior attempts have not been successful because, in most cases, the retainer has copied existing designs of roller cages and retainers made of metal. Metal retainers of the prior art have generally required an expensive cage-closing-in operation and in reproducing such retainers or cages in injection molded parts the design has had to go to retainers composed of two-parts in order to permit insertion of the tapered rollers and effective caging thereof.

SUMMARY OF THE INVENTION

The present tapered roller retainer is characterized by a body having a single flange supporting caging fingers formed to provide reverse tapered pocket cages for the tapered rollers. The retainer is more particularly characterized by being a one-piece molded body formed of glass reinforced nylon by standard injection molding process, and in which the reverse tapered pocket cages for the tapered rollers have the large diameter ends located at the single flange and the small diameter ends located at the free ends of the cage fingers. The particular advantage of a single flange retainer is that the cage fingers, while inclined radially inwardly to form a conical configuration, may be radially displaced toward a cylindrical configuration to enlarge the space between the free ends of the fingers to accept the rollers without difficulty. Release of the free ends of the cage fingers permits the fingers to return to their original position effectively caging the rollers and forming an integral roller-cage assembly.

The method of effecting bearing assembly includes the steps of flexing the retainer cage fingers to an enlarged circumferentially spaced position whereby the free ends of the fingers are opened to receive the large diameter ends of the tapered rollers, and inserting the resulting integral roller cage assembly, flange end first, over the small diameter end of the bearing cone in a single continuous motion so that the cage fingers are momentarily flexed radially outwardly to pass over the rib at the small diameter end of the cone and snap back to cage the tapered rollers on the cone raceway.

BRIEF DESCRIPTION OF THE DRAWINGS

A preferred embodiment of the present invention is shown in the accompanying drawings wherein:

FIG. 3 is a fragmentary sectional view of the roller retainer taken at line 3—3 in FIG. 1;

FIG. 4 is another fragmentary sectional view of the roller retainer taken at line 4—4 in FIG. 1;

FIG. 5 is a sectional elevational view of the roller retainer prior to insertion of the tapered rollers;

FIG. 6 is a sectional elevational view of the roller retainer mounted on the roller insertion tool to flex the retainer fingers radially outwardly to a generally cylindrical configuration to receive the rollers; and FIG. 7 is a sectional view of the method of ayplying the retainer and rollers as a unit on to the cone to form a cone assembly.

DESCRIPTION OF THE PREFERRED EMBODIMENT

Figure 1:
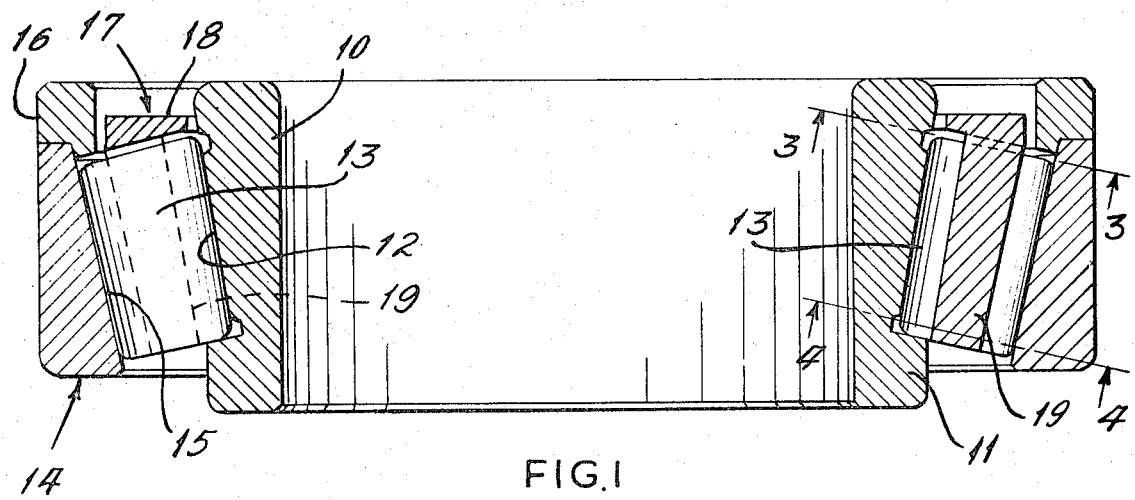
FIG. 1 is a sectional elevational view of a roller bearing assembly showing the improved roller retainer in operative position with the tapered rollers between the cone and cup.

In FIG. 1 it can be seen that the bearing assembly is composed of a cone 10 having a thrust rib 11 at the small diameter end and a raceway 12 inwardly of the thrust rib 11. A plurality of tapered rollers 13 are engaged on the cone raceway 12 with the small diameter ends in running contact with the thrust rib 11. A cup 14 has its raceway 15 engaged on the tapered rollers 13, and a separately formed thrust rib 16 is mounted at the large diameter end of the cup 14 to guide the large diameter ends of the rollers 13.

The assembly of FIG. 1 includes the improved roller cage or retainer 17 which maintains the rollers 13 in proper spaced relation around the raceways 12 and 15. The retainer 17 is a one-piece molded body having a circular base flange 18 spaced between the large diameter end of the cone 10 and the cup thrust rib 16. A plurality of fingers 19 extend from the flange 18 toward the small diameter ends of the rollers 13. The retainer 17 is molded from glass-reinforced nylon so as to be flexible for facilitating methods of assembly to be described presently. Moldable glass-reinforced nylon provides great accuracy of molding, stability of dimensional characteristics and reliability of operation under conditions of bearing loads and stresses. Furthermore, a single flange, one-piece retainer eliminates the usual cage-closing-in operation, and permits installation of the retainer 17 and rollers 13 as a unit in the final step of effecting the cone assembly. The glass reinforced nylon material permits mass producing the retainer 17 by injection molding procedures which results in great accuracy and dimensional reliability.

Figure 2:
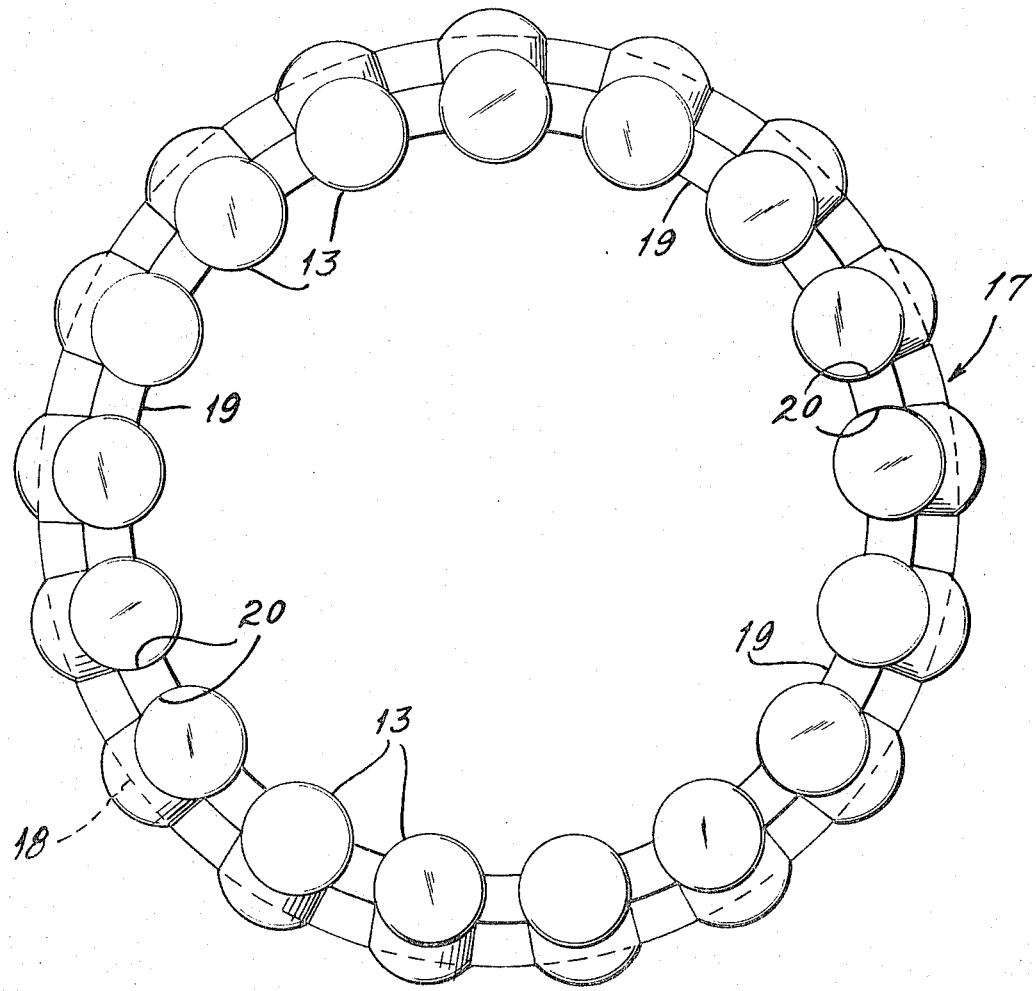
FIG. 2 is a plan view of the roller retainer with the tapered rollers assembled therein.

In FIG. 2 the retainer 17 and rollers 13 as a unit assembly may be seen to better advantage. The retainer flange 18 supports the plurality of fingers 19 in radially inwardly inclined positions but with the necessary circumferential spacing to engage the tapered rollers 13 with the large diameter ends of the rollers adjacent the flange 18. Each finger 19 is formed with its side faces 20 circularly dished or concave to substantially match the convex and tapered body of the rollers 13 caged therebetween. The fragmentary sections of FIG. 3 and 4 illustrate that the spacing between the base ends of the fingers 19 adjacent the retainer flange 18 is larger than the spacing between the fingers 19 at the free ends. The difference in this spacing is matched to the difference in diameter at the two ends of the tapered rollers 13. The finger side faces 20 are circularly formed and tapered from the flange 18 toward the free ends so as to closely follow the roller taper. The retainer 17 formed in this manner will not, when in its normal unstressed condition, receive the large diameter ends of the rollers 13 between the free ends of the fingers 19.

ASSEMBLY METHODS

Turning now to FIGS. 5 and 6, there is shown a preferred method of assembling the retainer 17 and rollers 13. FIG. 5 shows the retainer 17 in its normal unstressed condition before insertion of the rollers 13. As shown in FIG. 6, the retainer 17 is pressed over a finger expanding mandrel 21 until its flange 18 seats upon the step 22. The mandrel side faces 23, being in the form of a cylinder, expands the fingers 19 to an extent sufficiently to open the space at the free ends of the fingers 19 to allow the large diameter ends of the tapered rollers to pass between the circularly dished faces 20. The insertion of the rollers 13 is facilitated by forming the mandrel 21 with pockets 24 which align with the spaces between fingers 19. Thus the tapered rollers 13 may be inserted in the respective spaces between each of the several fingers 19 with ease. When a complete complement of rollers 13 has been inserted, a removal ring 25 is axially advanced along the mandrel 21 to drive the retainer 17 and rollers off the mandrel end, and in this removal operation the fingers return to the angularly inwardly inclined positions seen in FIG. 5, thereby caging the rollers 13 in proper position between the fingers.

FIG. 7 illustrates the step in the method of installing the retainer 17 and rollers 13 onto the cone 10 by pressing the retainer 17 flange end first over the cone small diameter thrust rib 11. In this operation the thrust rib 11 causes the fingers 19 to expand radially outwardly due to the roller interference on the thrust rib 11. The insertion is easily accomplished in a continuous thrust motion (arrow A) to slide the retainer 17 over the rib 11 until the finers 19 can resume their original position to cage the rollers 13 against the cone raceway 12.

SUMMARY OF THE DISCLOSURE

The disclosure herein presented is of a unique retainer of one-piece molded glass-reinforced nylon material for caging tapered rollers in an integral retainer-roller assembly. The one-piece retainer avoids present cage-closing-in operations, and allows a much simpler method of installing the assembly on a bearing cone by simply snapping the retainer and its caged rollers over the small end rib of the cone. The single flange 18 form of the retainer 17 permits installation of the retainer as the final step of the cone assembly.

The retainer 17 is provided with resilient fingers 19 having reverse tapered roller pockets between the dished or concave faces 20 so that the rollers are securely caged in operating position. The resilient character of the fingers 19 and the open-ended pockets allows a simple method of loading the rollers into the retainer by the method illustrated in FIG. 6.

It should now appear clear from the foregoing specification that the tapered roller retainer with its open-end roller pockets formed between circumferentially spaced fingers has the advantage over prior roller retainers or cages in that the fingers may be easily expanded radially outwardly to open up the circumferential spacing sufficient to accept the rollers with the large diameter ends foremost. A simple assembly tool is all that is needed to retain the fingers of the retainer in their circumferentially enlarged or expanded positions during the insertion of the tapered rollers, and after the tool has been withdrawn the fingers quickly return to normal positions effectively caging the tapered rollers and forming the desired integral retainer-roller assembly.

It should now be understood from the foregoing specification that the integral retainer-roller assembly is capable of speeding up the method of assembling a complete bearing as the roller retainer can be again momentarily flexed as it is pushed over the small end thrust rib of the bearing cone. This improved method of bearing assembly is made possible because of the single flange construction of the retainer.

A characteristic advantage of the single flange tapered roller retainer is in forming the roller cage fingers to normally assume an angular or inwardly inclined position relative to the flange which will contact the rollers, caging them in proper alignment, and in utilizing glass reinforced nylon material which will allow the cage fingers to be flexed radially outwardly so that the fingers may assume a generally cylindrical configuration in order to initially insert the tapered rollers and for purposes of simplifying the assembly steps in producing a complete bearing.

What is claimed is:

1. An integral tapered roller and roller retainer assembly comprising tapered rollers and a roller retainer body being characterized by an annular base flange and circumferentially spaced roller retainer fingers extending from base ends at said base flange in a common direction to outer free ends, said fingers normally forming elements of a cone with said free ends circumferencially closer together than said base ends, said body being formed of material having flexibility sufficient to permit said fingers to be expanded radially into positions in which the circumferential spacing between the outer free ends is substantially the same as at said base ends, and each pair of fingers having opposed surfaces adapted to cage a tapered roller therebetween against falling out radially inwardly or outwardly of said body.

2. The retainer of claim 1 wherein said fingers are spaced apart from base ends to free ends to form reverse tapered pockets, and said opposed surfaces are segments of a circle of a size sufficient to cage said rollers against skewing.

3. An integral tapered roller and roller retainer assembly comprising a complement of tapered rollers, and a one-piece molded body for holding said tapered rollers, said body being characterized by an annular base flange and integrally formed roller retainer fingers extending from said base flange to outer free ends, said fingers being at the free ends radially inwardly displaced relative to the ends adjacent said base flange to reduce the circumferential spacing between each pair of fingers at the free ends to less than the circumferential spacing adjacent said base flange, said fingers collectively being capable of being flexed radially outwardly to positions in which the circumferential spacing at said free ends is at least equal to the circumferential spacing at the ends adjacent said base flange and each finger having arcuately concave surfaces substantially matching the curvature of the tapered rollers and of sufficient arcuate extent to cage the rollers to be retained thereby.

4. The roller and roller retainer assembly of claim 3 in which said fingers are formed with opposed concave surfaces forming tapered pockets for the tapered rollers, said flexing of the fingers radially outwardly transforming said tapered pockets into substantially cylindrical pockets.

* * * * *